United States Patent [19]

Naylor et al.

[11] 4,060,501
[45] Nov. 29, 1977

[54] NOVOLAK DERIVATIVES AS DEFOAMERS

[75] Inventors: Carter G. Naylor; Ernest L. Yeakey, both of Austin, Tex.

[73] Assignee: Texaco Development Corporation, New York, N.Y.

[21] Appl. No.: 718,640

[22] Filed: Aug. 30, 1976

[51] Int. Cl.$^2$ .......................... C11D 1/72; C11D 1/76; C11D 3/20
[52] U.S. Cl. ................................. 252/548; 252/89 R; 252/135; 252/321; 252/358; 252/539; 252/540; 252/558; 252/559; 260/57 R; 260/59 R
[58] Field of Search ................. 252/89, 135, 321, 358, 252/558, 559; 260/57 R, 59 R

[56] References Cited

U.S. PATENT DOCUMENTS

| | | | |
|---|---|---|---|
| 2,454,541 | 11/1948 | Bock et al. | 260/53 |
| 2,499,370 | 3/1950 | De Groote et al. | 252/331 |
| 2,557,081 | 6/1951 | De Groote et al. | 252/331 |
| 2,622,069 | 12/1952 | Monson | 252/321 |
| 2,629,704 | 2/1953 | De Groote et al. | 260/53 |
| 2,748,087 | 5/1956 | Monson | 252/321 |
| 3,215,635 | 11/1965 | Liebling et al. | 252/321 |
| 3,382,178 | 5/1968 | Lissant et al. | 252/135 |

*Primary Examiner*—P.E. Willis, Jr.
*Attorney, Agent, or Firm*—Carl G. Ries; James L. Bailey; Thomas H. Whaley

[57] ABSTRACT

Novel defoamer and foam inhibitor compositions comprising the reaction product obtained by alkoxylating a novolak resin having a functionality less than 3, said alkoxylation being carried out with ethylene oxide and a higher alkylene oxide of 3 carbons or more in a manner such that the final defoamer composition has a cloud point of 10°–60° C. Said defoamer compositions are particularly useful as a minor portion of a dishwater detergent, and can be used in defoaming and inhibiting foam formation and in diverse types of normally foamable systems, particularly aqueous systems.

20 Claims, No Drawings

NOVOLAK DERIVATIVES AS DEFOAMERS

BACKGROUND OF THE INVENTION

1. Field of the Invention

This invention relates to a specific class of alkoxylated novolak resin compositions useful in defoaming and inhibiting foam formation in systems of many types, and preferably in normally aqueous systems.

2. Description of the Prior Art

Alkoxylated novolak resin compounds of various structures are well known. Materials of this type are useful as surface agents, as defoamers, as emulsion breakers, particularly petroleum emulsion breakers, etc. Particular reference may be made to U.S. Pat. Nos. 2,076,624; 2,499,360-370; 2,914,484; 3,202,615; 3,684,735; 3,048,548; 3,082,172; and 3,382,178.

However, in order to synthesize an alkoxylated novolak for a particular end-use, such as a foam inhibitor or defoamer, it is necessary that the chemical structure be carefully tailored in a chemical sense so that the derived activity is obtained. It is important that both the basic structure of the molecule such as initiator, and alkylene oxide or mixture of alkylene oxide reagents be carefully chosen to achieve a final molecule of requisite activity. Thus, for example, depending upon its structure, and/or process of making, a particular alkoxylated novolak may act in one case as a foam generator and in another situation as a foam suppressant.

It therefore becomes an object of the invention to provide a new class of compositions useful in inhibiting foam formation and/or collapsing already foamed systems. A more specific object of the invention is to provide a defoamer composition useful in inhibiting defoaming foam formation in aqueous systems, and particularly in dishwater containing detergents used for washing. Other objects will appear hereinafter.

SUMMARY OF THE INVENTION

Accordingly, the present invention is a novel composition useful as a defoamer and foam inhibitor comprising the reaction product obtained by alkoxylating a novolak resin having a functionality less than 3, said alkoxylation being carried out with ethylene oxide and a higher alkylene oxide of 3 carbons or more in a manner such that the final defoamer composition has a cloud point of 10°-60° C.

DETAILED DESCRIPTION OF THE INVENTION

The compositions here useful as defoamers and foam inhibitors consist of a reaction product of a novolak resin and alkylene oxide. The alkoxylation of the novolak should be carried by a combination treatment with ethylene oxide and a higher alkylene oxide of three carbons or more in a manner of such that the resultant defoamer composition has a cloud point of 10°-60° C. It has been found that compounds of this type are excellent defoamers whereas those alkoxylated novolak compositions having a cloud point substantially without said range have measurably decreased activity in this area.

To provide the compositons described here, one first prepares a novolak resin. These phenol-aldehyde resins are polynuclear compounds having the structure:

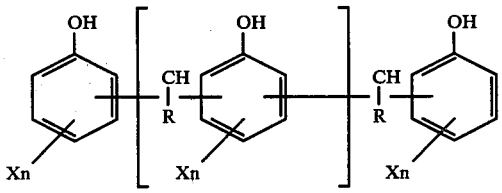

wherein R is hydrogen or an alkyl radical having from 1 to 3 carbon atoms, X is hydrogen, hydroxy, chlorine, bromine, or an alkyl radical having from 1 to 12 carbon atoms, $n$ is an integer from 1 to 2 and $m$ is an integer from 0 to 4.

The novolak resins are prepared by condensing phenol or an ortho or para-substituted derivative thereof, such as cresol, xylenol, resorcinol, chlorophenol, bromophenol, isopropylphenol, t-butylphenol, octylphenol, nonylphenol, or dodecylphenol with an aldehyde in acidic solution and at a reaction temperature between about 60° and 160° C. The novolak resins may contain from 2 to 6 aromatic rings per molecule, but preferably contain an average of from 2.2 to 3.2 aromatic preferably, benzene rings.

The aldehydic reactant can be formaldehyde, acetaldehyde, propionaldehyde, or butyraldehyde, but is preferably formaldehyde, or a derivative, e.g., trioxane. Suitable acidic catalysts for the novolak resin reaction are oxalic acid, zinc acetate, hydrochloric acid, sulfuric acid or stannous octoate.

The reaction for making the novolak resins is carried out at the above temperature range and at atmospheric pressure or thereabouts, employing the phenol or phenolic derivative in amounts corresponding to from about 1.5 to about 4.0 moles of phenolic compounds per mole of aldehyde.

Thereafter, the above described novolaks may be used directly in the next step involving alkoxylation without stripping or the novolak may be first stripped of excess phenolic compound.

The above novolaks are then reacted with ethylene oxide and a higher alkylene oxide in a manner that is such that the final defoamer composition has the desired cloud point. The alkoxylation or series of alkoxylations can be carried out in the usual manner. The novolak which can be here considered the initiator is reacted with the alkylene oxide or alkylene oxides using techniques known to those skilled in the art. As an example, see U.S. Pat. Nos. 2,948,757 and 3,000,963. The alkoxylation reaction itself is usually carried out in the presence of either acidic or alklaine catalysts with the latter being preferred. Examples of typical acidic catalysts include sulfuric acid, phosphoric acid and Lewis acids such as stannic chloride and boron trifuloride. Typical alkaline catalysts include tertiary amines, sodium hydroxide, potassium hydroxide, quaternary ammonium hydroxides, sodium carbonate, potassium carbonate, sodium methoxide, calcium hydroxide and barium hydroxide. Especially preferred catalysts are sodium hydroxide and potassium hydroxide.

The alkoxylation reaction may also be carried out over a wide temperature range, say within 50° 1 to 200° C. If the alkylene oxide is a gas such as ethylene oxide and propylene oxide at the above temperature, the reaction is preferably conducted in a closed vessel under pressure. The particular pressure employed is not critical and autogenous pressures are generally used.

In addition to ethylene oxide, the novolak is also simultaneously or sequentially reacted with a higher alkylene oxide, that is, one containing three carbons or more. Preferred among these is propylene oxide. In addition to propylene oxide, preferred higher alkylene oxides are those containing 3–18 carbon atoms. Illustrative higher alkylene oxides include the following:

Isobutylene oxide, 1,2-epoxybutane, 2,3-epoxybutane, 2,3-dimethyl-2,3-epoxybutane, 2-methyl-2,3-epoxypentane, 1,2-epoxyheptane, 5-methyl-1,2-epoxyhexane, 3,4-epoxyheptane, styrene epoxide, 1-cyclohexylepoxyethane, 2-methyl-1,2-epoxyheptane, 1,2-epoxyoctane, 2,4,4-trimethyl-1,2-epoxypentane, 2,4,4-trimethyl-2,3-epoxypentane, 1-phenyl-1,2-epoxypropane, 2-phenyl-1,2-epoxypropane, 1,2-epoxynonane, 1-phenyl-2-methyl-1,2-epoxypropane, 1-phenyl-1,2-epoxybutane, 4-phenyl-1,2-epoxybutane, 4-phenyl-1,2-epoxybutane, 5-phenyl-1,2-epoxypentane, 1,2-epoxydecane, 1(p-tolyl)-1-methyl-3-phenyl-2,3-epoxybutane, 1-phenyl-2-ethyl-1,2-epoxybutane, 1-phenyl-2-methyl-1,2-epoxypentane, 1,2-epoxydodecane, 3-ethoxy-4-propyl-3,4-epoxy-heptane, 1,1-diphenyl-1,2-epoxypropane, 1,2-diphenyl-1,2-epoxypropane, 1,3-diphenyl-1,2-epoxypropane, 1-phenyl-2-(p-tolyl)-epoxyethane, 1-phenyl-1-(m-meethoxyphenyl)-epoxyethane, 1-phenyl-1-(o-methoxyphenyl)-epoxyethane, 1'1-diphenyl-2-methyl-1,2-epoxypropane, 2,3-diphenyl-2,3-epoxybutane, 1,1-diphenyl-1,2-epoxybutane, 1,1-di(p-tolyl)-epoxyethane, 1,3-diphenyl-2-methyl-1,2-epoxypropane, 1-phenyl-2-benzole-1,2-epoxypentane, 1-phenyl-2-benzole-3-methyl-1,2-epoxybutane, 1,2-epoxyoctadecane, 9,10-epoxyoctadecene, and epichlorohydrin, etc.

Any sequence of addition of alkylene oxide to novolak initiator may be carried out as long as the final alkoxylated product has a cloud point falling within the 10°–60° C. range. However, a greatly preferred procedure involves first alkoxylating the novolak with ethylene oxide or a mixture of ethylne oxide and higher alkylene oxide (defined as an alkylene oxide containing 3 or more carbon atoms, most preferably 3–18). If a mixture of ethylene oxide and higher alkylene oxide is employed, it is necessary that the ethylene oxide content predominate in the mixture. This first alkoxylation is then followed by a final alkoxyation with a higher alkylene oxide or a mixture of ethylene oxide and higher alkylene oxide. In this instance when a mixture of alkylene oxide is used, the higher alkylene oxide should predominate over the ethylene oxide. One may also repeat this processscheme to obtain alternating claims.

In the most preferred mode of preparing the compositions of the invention, the first alkoxylation is accomplished by reacting the novolak with ethylene oxide or a mixture of ethylene oxide and a higher alkylene oxide wherein 60–99 weight percent of the mixture is ethylene oxide, preferably 60–90 weight percent, followed by a final alkoxylation utilizing a higher alkylene oxide or a mixture of a higher alkylene oxide and ethylene oxide wherein 60–99 weight percent of the mixture is composed of the higher alkylene oxide, preferably 60–90 weight percent. Thus, in most instances, the compositions here will have an intermediate hydrophilic chain, and be terminated by a hydrophobic chain in the relative sense, wherein a higher alkylene oxide, such as propylene oxide predominates. IN other cases the compsitions will have a plurality of alternating ethylene oxide-rich and higher alkylene (propylene)-rich claims, terminating with the latter.

The products of the invention may be used to defoam, and control foams of a great number of systems under foaming attack. They are particularly adaptable for use in aqueous systems. Thus, the compositions may be used in the following: the feed water of boilers such as wayside boilers; for use in non-frothing emulsions used in leather tanning; in the textile industry; for incorporation into dye baths, dye pastes, discharge pastes and the like; to prevent foaming and resultant loss of liquid from a circulating cooling system; in fermentation processes, in signle of multiple-effect concentrators containing aqueous, organic or inorganic type materials and the like; in controlling foaming of latex emulsions used for paints or coatings; in inhibiting and controlling foam in pulp and paper manufacture; in inhibiting foam normally occurring during preparation and concentration of natural or synthetic rubber latexes, etc.

A greatly preferred use of the cmpositions here involves the area of machine dishwashing. The compositions here may be used in both commercial and home machines, and can be used as part of a formulation of an alkaline inorganic detergent system which may optionally also contain amounts of well-known anionic, cationic, nonionic or amphoteric organic detergents such as alkyl aryl sulfonates, alkyl sulfonates, alkanol amides or alkyl aryl polyethers. The alkaline inorganic detergent systems comprise various combinations of inorganic sodium and potassium salts, such as polyphosphates, silicates, carbonates, and basic materials such as sodium and potassium hydroxides. While the inorganic materials do not foam themselves, at higher food soil concentrations, above say about 0.05–0.1 percent, foaming becomes a problem. The inorganic detergent systems, being alkaline, cause some saponification of fatty food soils. This, plus the natural foaming properties of protein food soils, tends to produce foam in a wash tank. This foam causes overflow and loss of the wash solution, impairs themechanical operaion of the machine, and lowers the pessure at which the washing fluid is impelled against the utensils to be cleaned.

As just noted, a greatly preferred use of the anti-foam compositions here is with an alkaline inorganic detergent system which optionally may contain many of the just-mentioned well-known organic detergents or others. When present in such a dishwasher detergent, the anti-foamer of the invention will be present in an amount ranging from about 0.5 percent up to about 15 percent by weight of the total formulations, and more often is present in an amount of 1–10 percent by weight.

The anti-foam compositions here are effective then in as low a concentation as a few parts per million based on the weight of the system under control. In some situations, the amount of anti-foamer present based upon total weight of the system under foam attack may range as high as 1 percent.

In more detail, with respect to the preferred use of th compositions here in detergents and particularly in conventional machine dishwashing detergent systems, these systems originally were dry, inorganic systems and consisted entirely of mixtures of alkaline salts. The detergent system is required to perform three essential functions: (1) soften the water so that the detersive action can take place more effectivly; (2) remove the soil from the dishes thoroughly, completely and rapidly; and (3) leave the dish surface in a state where the water drains in a continuous film without breaking into little hanging drops or streams. Many of the alkaline salts act as both water softeners and soil removers but will be discussed on the basis of their primary function.

Sodium carbonate, although it is among the least effective water-softening agents, together with its sesquicarbonate, is almost universally used as a component in dishwashing compounds, because of its low cost. The detergent compositions of this type can contain from 0–99 percent by weight sodium or potassium carbonate.

The best and most efficient water-softening ingredients are the condensed polyphosphates, including the tripolyphosphates and the pyrophosphates. The detergent compositions then can contain from 0–70 percent by weight sodium or potassium polyphosphates. Other sequestering agents, including orgnic materials such as ethylenediaminetetraacetic acid and sodium gluconate, can also be employed in compositions of this type, particularly in formulations for dairy use containing high percentages of caustic.

Polyphosphates have been shown to promote corrosion of certain metal parts of dishwashing machines but this corrosive effect can be overcome by including a relatively large proportion of a silicate in the composition. In this connection, metasilicate is important, not only from the standpoint of the machine itself, but also from the standpoint of the utensils washed. For instance, regardless of whether polyphosphate is present in a solution or not, highly alkaline dishwashing detergents containing no silicates can attacke, etch, and darken aluminum utensils. Some of these formulations also have a destructive action on the over-the-glaze dish patterns. Suitable proportions of silicates in the fomulation help overcome these difficulties.

The soil-removing ingredients commonly employed in dishwashing compounds include borates and carbonates, which are relatively ineffective, and orthophosphates and metasilicates, both of which are highly effective. The detergent compositions then can include 0–70 percent by weight of trisodium or tripotassium phospate and 0–50 percent by weight of sodium or potassium meta-silicate.

More recently as discussed above small amounts of synthetic organic surfactants or wetting agents have been incorporated into machine dishwashing formulations to promote smooth drainage drying, i.e., to prevent water-break. Some formulations include from 1 to 5 percent or more of a low foaming polyethoxy type nonionic surfactant. The detergent dishwater compositions then can include 0–50 percent by weight of such synthetic, organic, low foaming, surfactants such as polyethoxy type nonionic surfactants.

Conventional machine dishwashing compositions employed for glass and bottle washing normally contain caustic soda as the major cleaning ingredient. Alkalies tend to attack glass surfaces bu this can be inhibited by zincates, beryllates, or aluminates. As stated above, sodium gluconate and ethylenediaminetetraacetic acid can be used as sequestering agents for high caustic content solutions. The detergent compositions can thus include 0–99 percent sodium or potassium hydroxide.

Hence the conventional detergent systems into which the defoamers of the invention can be incorporated contain as the principal detersive agent widely varying proportions of sodium or potassium polyphosphates, i.e., 0–70 percent, sodium or potassium silicates, i.e., 0–50 percent, sodium or potassium carbonates, i.e., 0–100 percent and trisodium or tripotassium phosphate, i.e., 0–70 percent. The amount of the polyoxyalkylene adduct of the novolak initiator then ordinarily constitutes about 0.5 to 15 percent by weight of the final detergent composition, and more often is 1–10 percent.

The following exmples illustrate preparation of typical compositions of the invention useful as defoamers. These examples are meant to be illustrative only and the invention is not to be limited thereto.

EXAMPLE I

Here 15 pounds of a phenol-formaldehyde novolak resin of functionality 2.5 already reacted with 3 equivalents of ethylene oxide per available hydroxyl group, and 150 rams of potassium hydroxide were charged to a reactor and stripped of water at 110° C for 1 hour. Thereafter, at 120° C 17 pounds ethylene oxide and 56 pounds propylene oxide were added in sequence. After 2 hours digestion, the product was neutralized and filtered. Ten gallons of product were obtained having a molecular weight of 3270 and a 10 percent cloud point of 27° C.

EXAMPLE II

Here 12 pounds of the ethoxylated novolak resin of Example I was first reacted with 23.1 pounds of ethylene oxide followed by reaction with 35.3 pounds of propylene oxide. The final product had a molecular weight of 3180 and a 10 percent cloud point of 39° C.

EXAMPLE III

This example was run like Example II with the xception that 12 pounds of the ethoxylated novolak was further reacted sequentially with 9 pounds of ethylene oxide and 49.3 pounds of propylene oxide to yield a product having a moelcular weight of 3220 and a 10 percent cloud point of 19° 1 C.

EXAMPLE IV

Here the ethoxylated phenol-formaldehyde resin of claim 1 was further reacted with a mixture of ethylene oxide and propylene oxide (14 weight percent ethylene oxide). A product was obtained having a molecular weight of 5400 and a 10 percent cloud point of 19.5° C.

Here defoaming effectiveness of the above products were tested as follows:

Defoaming effectiveness was measured under conditions simulating a mechanical dishwater. Into a cylindrical vessel, 65×150mm with a gas sparger at the bottom, was placed 100 ml. of a solution containing 0.15 percent milk and egg powder ("Flavor Form Protein," American Dietary Laboratory) and 0.10 percent builder. The builder was a 3:2.1 blend of sodium tripolyphosphate:sodium metasilicate:sodium carbonate. The solution was maintained at 50° as compressed air was passed through the sparger into the solution. One ml. increments of a 1 percent solution of the test surfactant were added, and the foam height generated by the flow of air was measured after each increment.

| Table of Defoaming Tests | | |
|---|---|---|
| Sample | Ml. of 1% Solution Added to Foam | Foam Height, mm. |
| Example I | 2 | 140 |
|  | 3 | 95 |
|  | 4 | 85 |
| Example II | 2 | >150 |
|  | 3 | 115 |
|  | 4 | 85 |
| Example III | 2 | 150 |
|  | 3 | 85 |
|  | 4 | 60 |
| Example IV | 2 | 50 |

| Sample | Ml. of 1% Solution Added to Foam | Foam Height, mm. |
|---|---|---|
| Pluronic 25R2 | 2 | >150 |
|  | 3 | >150 |
|  | 4 | 130 |

As can be seen from the above results, the defoamers of the invention are superior to a typical commercial defoamer.

We claim:

1. A composition useful as a defoamer and foam inhibitor comprising the reaction product obtained by alkoxylating a novolak resin having a functionality less than 3, said alkoxylation being carried out with ethylene oxide and a higher alkylene oxide of 3 carbons or more in a manner such that the final defoamer composition has a cloud point of 10°-60° C by first alkoxylating said novolak resin with ethylene oxide or a mixture of ethylene oxide and said higher alkylene oxide wherein said ethylene oxide predominates in said mixture, and effecting a final alkoxylation with said higher alkylene oxide or a mixture of ethylene oxide and said higher alkylene oxide wherein said higher alkylene oxide predominates.

2. The composition of claim 1 wherein sai higher alkylene oxide is propylene oxide.

3. The composition of claim 1 wherein said alkoxylation is carried out by first alkoxylating said novolak resin with ethylene oxide followed by a final alkoxyation with said higher alkylene oxide.

4. The composition of claim 3 wherein said higher alkylene oxide is propylene oxide.

5. The composition of claim 1 wherein said initial alkoxylation is carried out by reacting said novolak resin with ethylene oxide followed by a final alkoxylation with a mixture of said higher alkylene oxide and ethylene oxide.

6. The composition of claim 5 wherein said higher alkylene oxide is propylene oxide.

7. The composition of claim 1 wherein said first alkoxylation of said novolak is carried out utilizing a mixture of ethylene oxide and said higher alkylene oxide followed by a final alkoxylation with said higher alkylene oxide.

8. The composition of claim 1 wherein said first alkoxylation of said novolak resin is carried out by utilizing a mixture of ethylene oxide and higher alkylene oxide, and said final alkoxylation is carried out by utilizing a mixture of said higher alkylene oxide and ethylene oxide.

9. The composition of claim 7 wherein said higher alkylene oxide is propylene oxide.

10. The composition of claim 8 wherein said higher alkylene oxide is propylene oxide.

11. The composition of claim 1 wherein said alkoxylation is carried out by first alkoxylating said novolak resin with ethylene oxide or a mixture of ethylene oxide or a mixture of ethylene oxide and a higher alkylene oxide wherein 60-90 weight percent of said mixture is ethylene oxide, and effecting a final alkoxylation with a higher alkylene oxide or a mixture of said higher alkylene oxide and ethylene oxide wherein 60-90 weight percent of said mixture is a higher alkylene oxide.

12. The composition of claim 11 herein said higher alkylene oxide is proylene oxide.

13. The composition of claim 1 wherein said novolak resin has a functionality of 2-3.

14. The composition of claim 13 wherein said functionality is 2.3-2.7.

15. A process of defoaming and inhibiting foam formation in a system which normally tends to be foamable which comprises incorporating in said system the composition of claim 1.

16. The process of claim 15 wherein said system is an aqueous system.

17. The process of claim 16 wherein said aqueous system is a dishwater detergent.

18. A detergent composition comrpising an alkaline inorganic detergent and a synthetic organic detergent selected from the group consisting of an alkyl aryl sulfonate, an alkanol amide, an alkyl aryl polyether and mixtures thereof having also incorporated therein in a minor amount the composition of claim 1.

19. The composition of claim 18 wherein the composition of claim 1 is present in an amount of 0.5 - 15 percent by weight based on the total detergent compostion weight.

20. A detergent composition comprising an alkaline inorganic detergent and the composition of claim 1.

* * * * *